(12) United States Patent  
Shirai (10) Patent No.: US 6,390,678 B1  
(45) Date of Patent: May 21, 2002

(54) ROLLER CONNECTED BODY AND LINEAR GUIDE DEVICE USING IT

(75) Inventor: Takeki Shirai, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/424,831

(22) PCT Filed: Apr. 8, 1999

(86) PCT No.: PCT/JP99/01867

§ 371 Date: Dec. 1, 1999

§ 102(e) Date: Dec. 1, 1999

(87) PCT Pub. No.: WO99/53208

PCT Pub. Date: Oct. 21, 1999

(30) Foreign Application Priority Data

Apr. 9, 1998 (JP) ............................................ 10-097816

(51) Int. Cl.⁷ .............................................. F16C 29/06
(52) U.S. Cl. ........................................................ 384/44
(58) Field of Search ........................... 384/44, 569, 43, 384/565, 45

(56) References Cited

U.S. PATENT DOCUMENTS 3,937,532 A 2/1976 Fuhrmann et al.
4,561,703 A 12/1985 Dabringhaus

OTHER PUBLICATIONS

English Abstract of Japanese Utility Model Laid–Open No. 04–66421, dated Jun. 11, 1992.
Patent Abstracts of Japan, Publication No. 10089358, Published Apr. 7, 1998.
English Abstract of Japanese Utility Model Laid–Open No. 06–40451, dated May 31, 1994.
Patent Abstracts of Japan, Publication No. 05196037, Published Aug. 6,1993.
Patent Abstracts of Japan, Publication No. 05052217, Published Mar. 2, 1993.

*Primary Examiner*—Lenard A. Footland
(74) *Attorney, Agent, or Firm*—Arent Fox Kintner Plotkin & Kahn, PLLC (57) ABSTRACT

The present invention provides a roller connector rotatably retaining a plurality of rollers arranged in a line and capable of being incorporated into an endless roller-circulation path of an endless sliding type linear guide unit and it also provides an improved linear guide unit using such roller connector. The roller connector comprises a plurality of rollers arranged in a row with the axes of rotation of the rollers being held parallel with one another, a plurality of spacers interposed between a plurality of rollers and each provided with a pair of concave seats with which each of the rollers comes into sliding contact and an elongate flexible connecting portion adapted to connect the spacers together and characterized in that the connecting portion is connected to the spacers at a position at which the outer peripheral surface of each of the rollers is divided into two substantially equal parts in the axial direction and that the connecting portion is provided only one side of the line of rollers.

4 Claims, 12 Drawing Sheets

ROLLER CONNECTED BODY AND LINEAR GUIDE DEVICE USING IT

FIELD OF THE INVENTION

The present invention relates to a roller connector which rotatably retains a plurality of rollers in a line and which is incorporated into an endless roller-circulation path of an endless sliding type linear guide unit and also to an improvement in the linear guide unit of the above-type using such roller connector.

DESCRIPTION OF THE RELATED ART

Conventionally, there has been known a linear guide unit in which a slider is movably held in engagement with a track rail through a line of endlessly circulating rollers. More concretely, this linear guide unit comprises a plurality of rollers, a track rail which is arranged on a stationary portion such as a bed and which is provided with roller rolling surfaces and a slider provided with load rolling surfaces on which the rollers roll with respect to the roller rolling surfaces of the track rail while bearing a load thereon and an endless roller-circulation path with the inclusion of the load rolling surfaces whereby the slider having a table or a mechanical apparatus mounted thereon can move freely on the track rail following the endless circulation of the rollers.

The above-described linear guide unit having the track rail and the slider held in engagement with the track rail through the rollers has the advantage of improving the load bearing capacity of the slider as compared to such type of linear guide unit that makes use of rollers while on the other hand, it has the problem that the so called skewing of the rollers (oscillatory rotation of each roller about its axis) tends to take place. Therefore, it has been an important theme in securing the smooth rotation of the rollers and hence the smooth movement of the slider within the endless roller-circulation path how to prevent the above-described skewing of the rollers.

Figure 18:
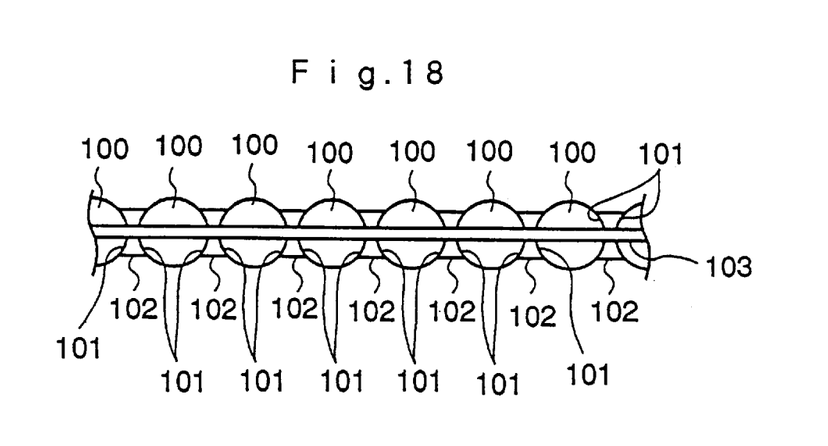
FIG. 18 is a side view of a conventional roller connector.
Figure 19:
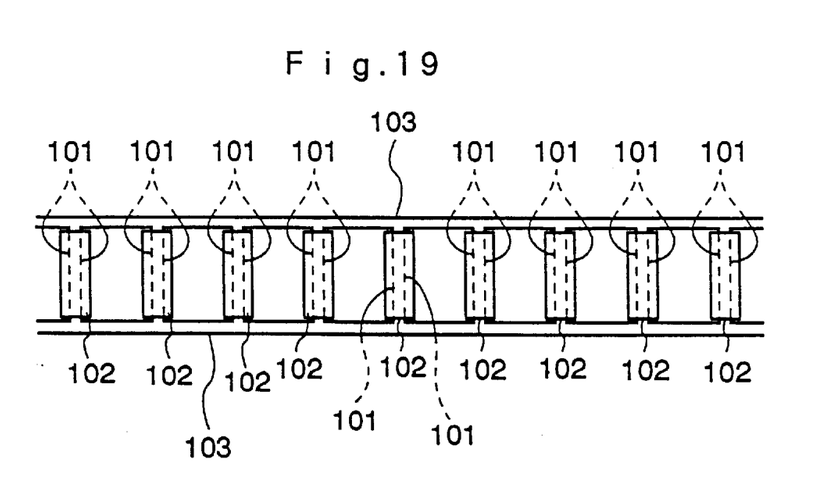
FIG. 19 is a plan view of a conventional roller connector.

Therefore, as a means for solving the above-described problems, there have already been provided a roller connector comprising a plurality of rollers connected together in a predetermined posture like a string of beads and a linear guide unit having an endless roller-circulation path of the slider into which the roller connector is incorporated (Japanese Patent Laid-Open No. 52217/1993). As shown in FIGS. 18 and 19, such roller connector comprises a plurality of rollers 100 arranged in a line with the axes of rotation thereof being held parallel to one another, a plurality of spacers 102 interposed among the rollers 100 and provided with concave seats 101 with which the rollers 100 come into sliding contact, respectively, and elongate flexible connecting portions 103 connecting the spacers 102 together and adapted to rotatably retain each of the rollers 100 by causing the spacers to sandwich the roller 100 therebetween from the front and rear sides thereof.

Accordingly, when such roller connector is incorporated into the endless roller-circulation path of the slider of the linear guide unit, each of the rollers 100 rolls within the endless roller-circulation path while it is retained in its predetermined posture by means of the spacers 102 from on both front and rear sides so that it is possible to cause the rollers 100 to smoothly circulate through the endless roller-circulation path while preventing the skewing of the rollers 100 and hence it is possible to make smooth the movement of the sliders with respect to the track rail.

However, in the case of the conventional roller connector of the above-described structure, there has hitherto been the possibility that the connecting portions become fatigued at an early stage of operation since the connecting portions are formed along both axial end surfaces of each of the rollers as shown in FIGS. 18 and 19, and therefore, when a force urging each of the rollers rolling through the endless roller-circulation path to skew, that is, a force oscillating the axis of rotation of each of the rollers acts on the roller, the connecting portions expand and contract in a repetitive fashion by such force.

Further, where the above-described roller connector is incorporated into the endless roller-circulation path of the slider, the sectional area of the endless roller-circulation path must be enlarged by a width corresponding to each of the connecting portions connecting the spacers together. Accordingly, if the connecting portions are present on both axial ends of each of the rollers as described above, where, for example, an endless roller-circulation path is formed by opening a roller return path in a slider, the diameter of the roller return path has to be made large so that the rigidity of the slider lowers to that degree which results in hindering the miniaturization of the slider.

SUMMARY OF THE INVENTION

The present invention has been made in view of the above-described problems.

Accordingly, an object of the invention is to provide a roller connector which can rotatably and stably retain a plurality of rollers in a predetermined posture for a prolonged period of time within an endless roller-circulation path formed in a slider of a linear guide unit.

Another object of the invention is to provide a roller connector which can improve the rigidity of the slider and contribute to the miniaturization of the slider.

A further object of the invention is to provide a linear guide unit using such roller connector.

In order to achieve the above-described objects, the roller connector of the present invention comprises a plurality of rollers arranged in a line with the axes of rotation of the rollers being held parallel to one another, a plurality of spacers interposed among the rollers and each provided with a pair of concave seats with which each of the rollers comes into sliding contact and an elongate flexible connecting portion connecting the spacers together and characterized in that the connecting portion is connected to the spacers at a position at which the connecting portion divides the outer peripheral surface of each of the rollers into two substantially equal parts in the axial direction and that the connecting portion is arranged only on one side of the line of rollers.

Further, the linear guide unit of the present invention using the above-described roller connector is required to have a structure comprising a number of rollers, a track rail having roller-rolling surfaces and a slider provided with an endless roller-circulation path having load rolling surfaces on which the rollers roll with respect to the roller-rolling surface of the track rail while bearing a load and it is characterized in that the above-described roller connector is incorporated into the endless roller-circulation path with the connecting portion of the roller connector lying inside the inner peripheral surface of the endless roller-circulation path of the slider, and that the endless roller-circulation path is provided with clearance grooves by which the connecting portion of the roller connector is received and guided.

According to such technical means, as in the case of the above-described conventional roller connector, each of the rollers is embraced in front and in rear by the adjoining spacers and rolls through the endless roller-circulation path of the slider of the linear guide unit in a state in which it is retained in a predetermined posture by the spacers. Consequently, it becomes possible to effectively prevent each of the rollers from skewing within the endless roller-circulation path.

However, in the case of the conventional roller connector, the connecting portions connecting the spacers are arranged along both end surfaces of each of the rollers in the axial direction thereof so that the connecting portions tend to become fatigued due to the application thereon of a force urging the rollers to skew during rolling while, on the contrary, the connecting portion of the roller connector according to the present invention is connected to each of the spacers at a position at which the connecting portion divides the outer peripheral surface of each of the rollers into two substantially equal parts in the axial direction so that the connecting portion does not expand and contract repeatedly due to the above kind of force thereby preventing the breakage of the connecting portion resulting from the fatigue thereof.

Further, since the connecting portion is provided only on one side of the line of rollers, where the roller connector of the present invention is incorporated into the endless roller-circulation path of the slider of the liner guide unit, the sectional area of the endless roller-circulation path can be made smaller than in the case of the conventional roller connector and also where roller return paths are formed in the slider, the lowering of the rigidity of the slider can be avoided and the miniaturization of the slider can be made with ease.

At the same time, when both axial end surfaces of each of the rollers come into contact with the inner wall of the endless roller-circulation path of the slider during the rolling operation of the roller, the posture of the roller becomes unstable due to a frictional force generating between the two so that the skewing of the roller tends to take place. Accordingly, it is preferable from the above point of view that the spacers be so provided as to prevent the movement of each of the rollers in the axial direction. For example, an annular groove may be provided in the central portion of the outer peripheral surface of each of the rollers in the axial direction so that each of the spacers fits in such annular groove so as to come into sliding contact with the roller.

With the above structure, since the axial position of each of the rollers is determined by the connecting portion of the roller connector and each of the spacers, if clearance grooves for guiding the connecting portion of the roller connector are formed in the endless roller-circulation path of the slider to be incorporated with the roller connector, it will be possible to completely prevent the displacement of each of the rollers in the axial direction during the rotation thereof and to minimize the possibility of skewing of the roller.

Further, where the roller connector circulates through the endless roller-circulation path as it expands and contracts, it is preferable to form a slit in each of the spacers from the side opposite to the connecting portion so as to separate the pair of concave seats formed on both sides thereof from the point of view of allowing each of the rollers to keep its suitable posture by the spacers. Thus, by the formation of such slit in each of the spacers, even when the roller connector bends to a great degree within the endless roller-circulation path, each of the spacers can be kept in sliding contact with the outer peripheral surface of each of the rollers by widening the slit so that the roller can always keep its suitable posture. Further, the formation of the slit has the advantage that each of the rollers can be removably mounted between the adjoining spacers with ease.

DESCRIPTION OF THE PREFERRED EMBODIMENTS

A roller connector according to the present invention and a linear guide unit using the roller connector will now be described with reference to the accompanying drawings.

Figure 1:
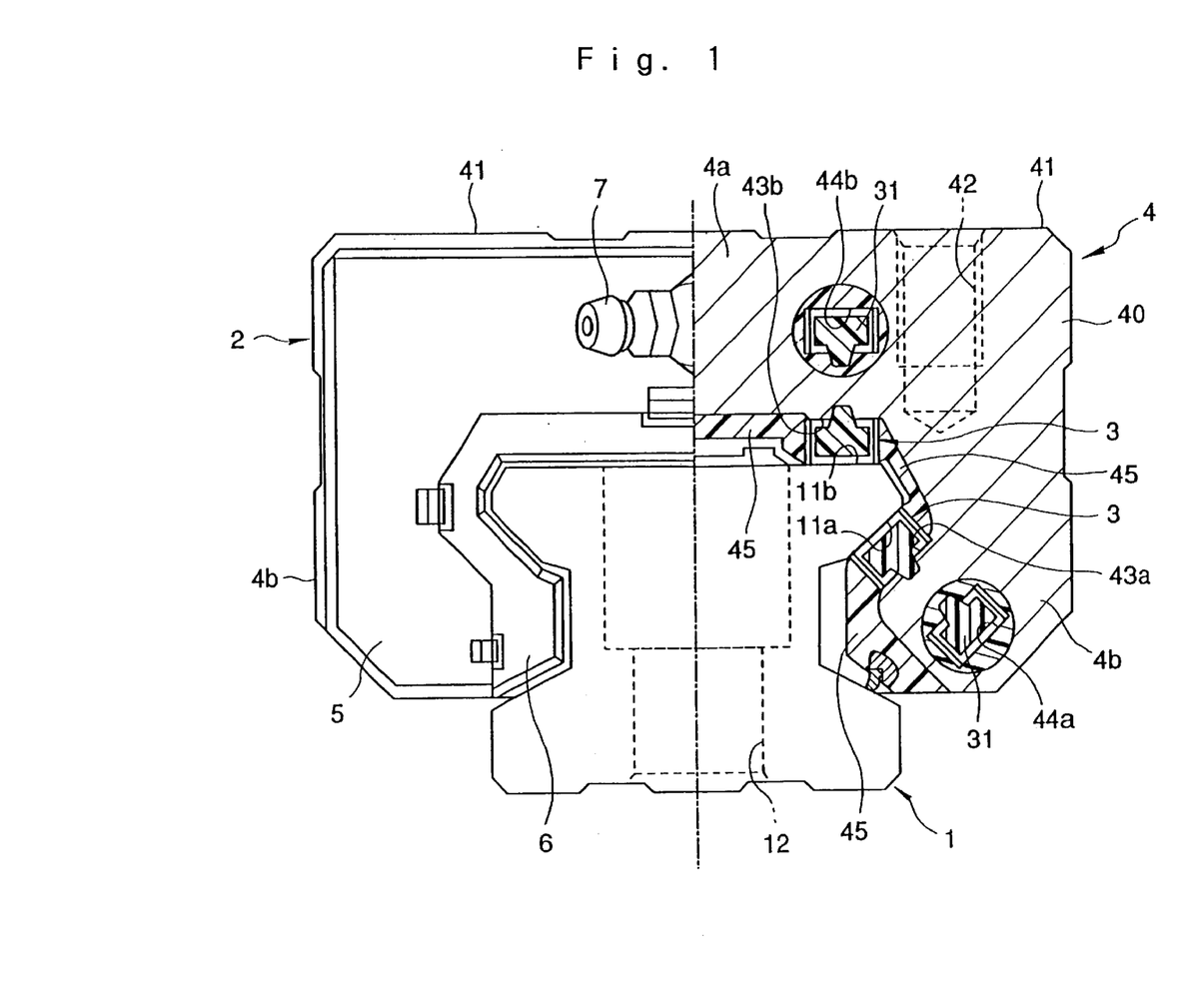
FIG. 1 is a front view (partly in section) of a linear guide unit using a roller connector according to the present invention.
Figure 2:
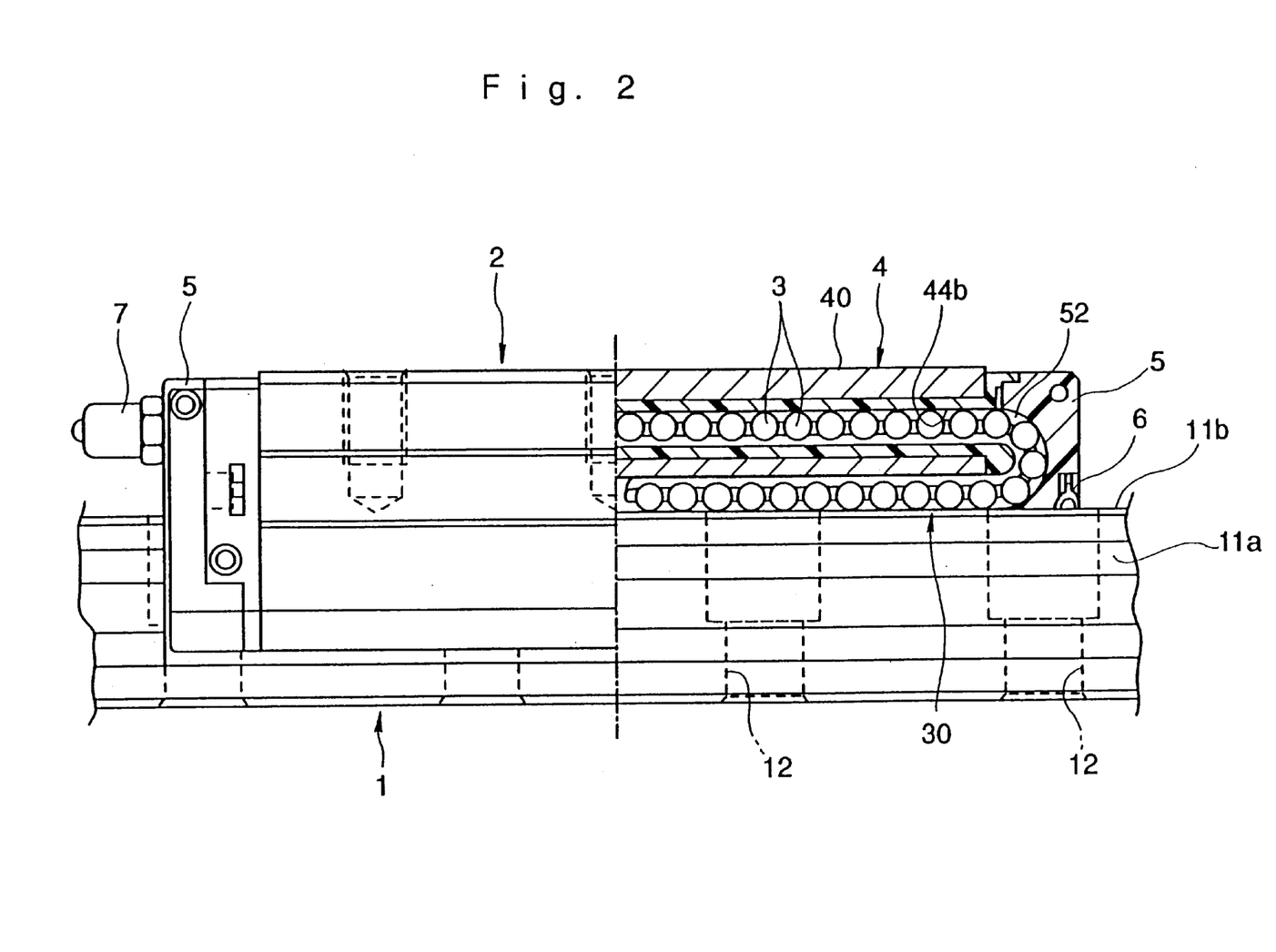
FIG. 2 is a side view (partly in section) of the linear guide unit shown in FIG. 1.

FIGS. 1 and 2 show a linear guide unit using a roller connector according to the present invention.

In these figures, reference numeral 1 designates a track rail arranged on a stationary portion such as a bed of a machine tool, reference numeral 2 designates a slider for guiding a movable body such as a table along the track rail 1 and reference numeral 3 designates rollers capable of rolling between the track rail 1 and the slider 2 while bearing a load and circulating endlessly within the slider 2.

First, the track rail 1 is substantially rectangular in shape and is provided with a total of four roller rolling surfaces 11a and 11b extending along the longitudinal direction (vertically in FIG. 1) of the slider. These roller rolling surfaces 11a and 11b are formed on both side surfaces and on both edges of the upper surface of the track rail 1, respectively, in such a manner that the roller rolling surfaces 11a on both side surfaces formed inwardly and downwardly at an angle of 30° with respect to the horizontal while the roller rolling surfaces 11b on the upper surface are formed vertically and upwardly. Further, the track rail 1 is provided with a plurality of bolt fitting holes 12 arranged in the longitudinal direction of the track rail 1 in spaced-apart relationships with one another and is fixed to the stationary portion by means of fixing bolts (not shown) to be inserted into the bolt fitting holes 12, respectively.

On the other hand, the slider 2 is formed of a movable block 4 having a fixing surface 41 to which a movable body such as a table is fixed and a plurality of tapped holes 42 into which fixing bolts for the movable body are respectively screw-fitted and a pair of covers 5 to be respectively fixed to the front and rear end surfaces of the movable block 4 whereby an endless roller-circulation path for the rollers 3 is formed within the slider by fixing the covers 5 to the movable block 4. Further, to the covers 5 there are respectively fixed sealing members 6 which come into sliding contact with the track rail 1 whereby the entry of dust adhered to the track rail 1 into the slider 2 due to the movement of the slider 2 is prevented. Note that in the drawings, reference numeral 7 designates a grease nipple for supplying grease into the slider 2.

The movable block 4 is substantially saddle-shaped in section with the inclusion of a horizontal portion 4a on which the mounting surface 41 is formed and a pair of skirts 4b and 4b extending downward from the horizontal portion 4a. Further, on the lower surface of the horizontal portion 4a and on the inner surface of each of the skirt portions 4b there are formed four load rolling surfaces 43a and 43b in opposite relationships with the roller rolling surfaces 11a and 11b of the track rail 1, respectively. In addition, on the horizontal portions 4a and the skirt portions 4b there are formed roller return ports 44a and 44b so as to correspond to the load rolling surfaces 43a and 43b, respectively.

This movable block 4 is manufactured by injection-molding a synthetic resin material. That is, it comprises a metallic block 40 and a synthetic resin portion padded to the former by injection-molding and the above-described movable body mounting surface 41 and the load rolling surfaces 43a and 43b of the rollers 3 of which a sufficient mechanical strength is required are formed on the movable block 40 while the roller return ports 44a and 44b of which not so high mechanical strength is required are formed on the synthetic resin portion thereby reducing the weight of the movable block 4 as small as possible.

Figure 3:
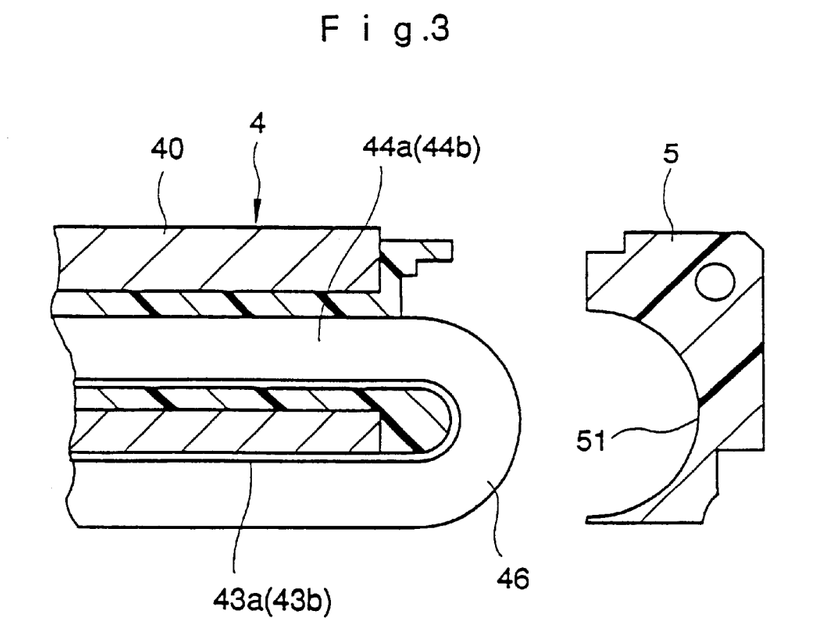
FIG. 3 is an exploded sectional view of an endless roller-circulation path of a slider of the linear guide unit shown in FIG. 1 with the view showing how the endless roller-circulation path of the slider is assembled.
Figure 4:
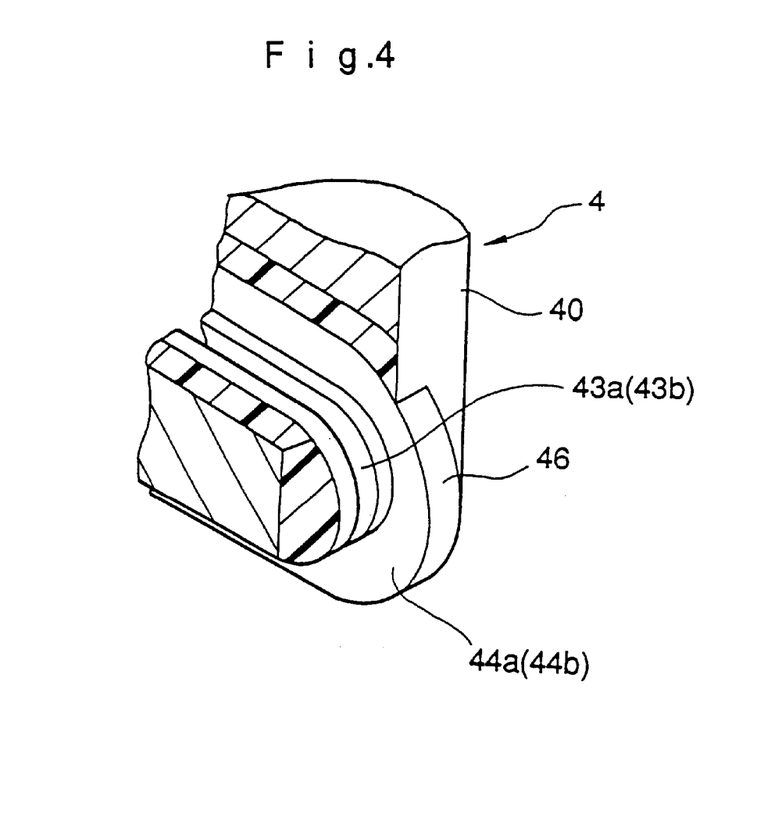
FIG. 4 is a perspective view of one end surface portion of a movable block according to the present invention.
Figure 5:
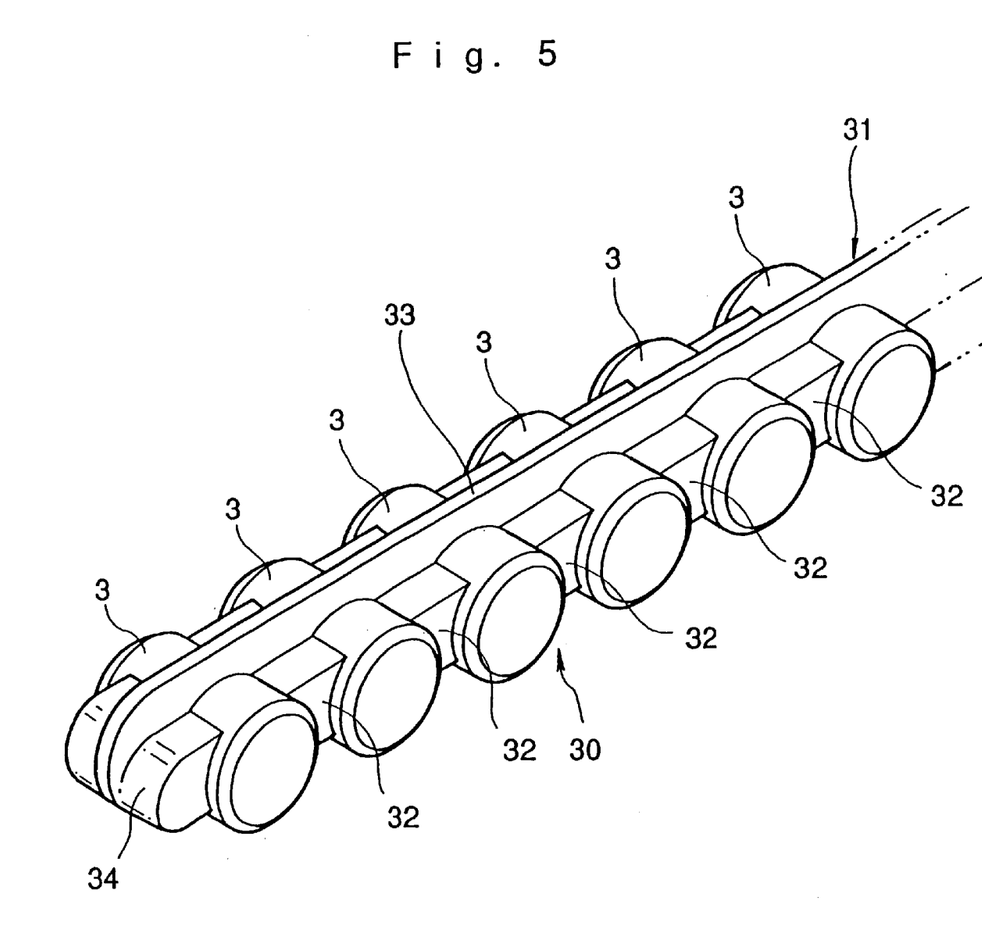
FIG. 5 is a perspective view of a roller connector to be incorporated into a liner guide unit according to a first embodiment of the present invention.
Figure 6:
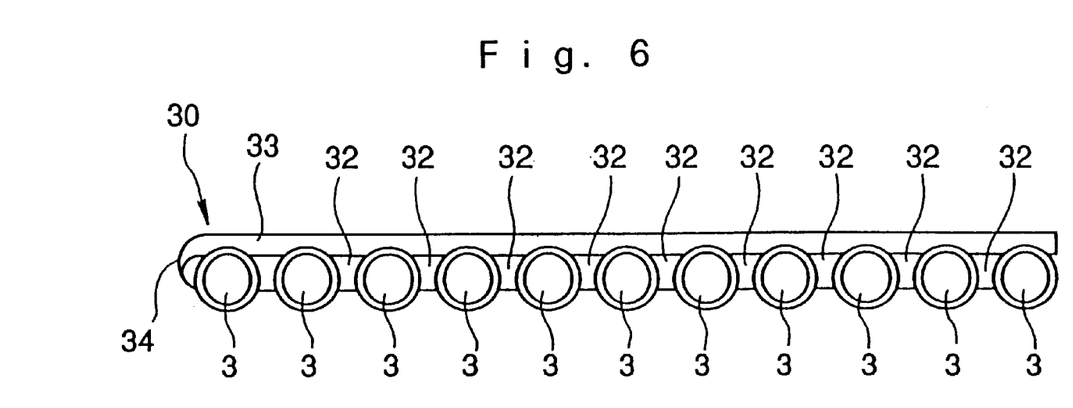
FIG. 6 is a front view of a roller connector according to the first embodiment of the present invention.
Figure 7:
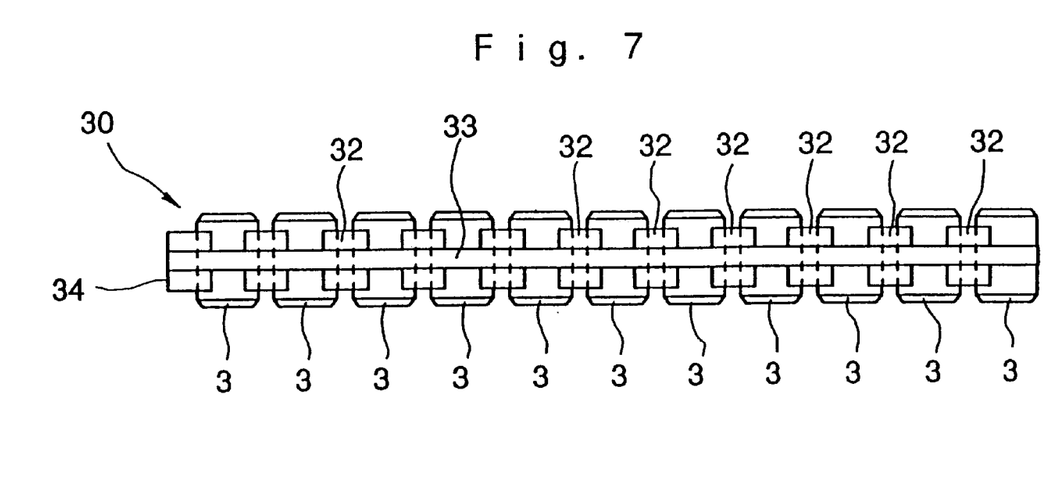
FIG. 7 is a side view of the roller connector shown in FIG. 6.
Figure 8:
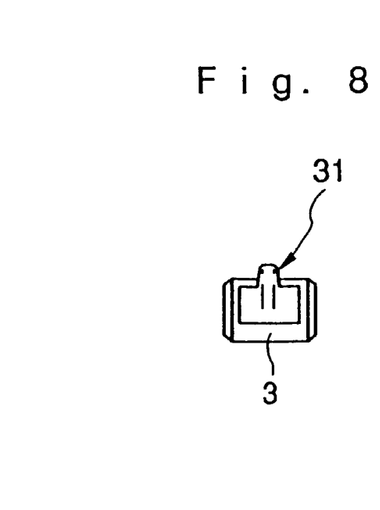
FIG. 8 is a plan view of the roller connector shown in FIG. 6.

As shown in FIG. 3, the endless circulation path for the rollers becomes complete by fixing the covers 5 to the end surfaces of the movable block 4, respectively. That is, on the inner surface of each of the covers 5 is provided with a U-shaped groove 51 for guiding the rollers 3 which have rolled on the load rolling surfaces 43a and 43b while projecting semicircular roller guide portions 46 are formed on the both end surfaces of the movable block 4 as shown in FIG. 4 so that when the covers 5 are respectively fixed to the end surfaces of the movable block 4, the roller guide portion 46 of the movable block 4 fits in the U-shaped groove 51 of each of the covers 5 to thereby complete a U-shaped change direction path 52 as shown in FIG.2. Thus, by this change direction path 52 the load rolling surfaces 43a and 43b of the movable block 4 and the roller return ports 44a and 44b are connected.

With the above arrangement, when the rollers 3 which are bearing a load between the roller rolling surfaces 11a and 11b of the track rail 1 and the load rolling surfaces 43a and 43b of the movable block 4 have rolled on the load rolling surfaces 43a and 43b with the movement of the slider 2, the rollers 3 are released from the load to enter into the change direction path 52 of one of the covers 5. Then the rollers 3 roll through the roller return ports 44a and 44b of the movable block 4 in a direction reverse to their rolling direction through the load rolling surfaces 43a and 43b in a no-load state. Further, the rollers 3 which have finished rolling through the roller return ports 44a and 44b again enter between the track rail 1 and the movable block 4 through the change direction path 52 of the other cover 5 and roll on the load rolling surfaces 43a and 43b while bearing the load.

Further, on both sides of each of the load rolling surfaces 43a and 43b there are formed synthetic resin roller guide portions 45 for guiding both end surfaces of the rollers 3 rolling on the load rolling surfaces 43a and 43b so that the rolling direction of the rollers 3 is regulated by these roller guide portions 45 from on both sides thereof and the skewing of the rollers 3 during their rolling operation is prevented.

FIGS. 5 through 8 show first embodiment of the roller connector of the present invention to be used in the linear guide unit. The roller connector 30 comprises a flexible synthetic resin roller connecting member 31 and a plurality of rollers 3 arranged on the roller connecting member 31 in spaced apart relationships with one another with the axes of rotation of the rollers 3 being held parallel to one another. The roller connecting member 31 comprises a plurality of spacers 32 interposed among the adjoining rollers 3, respectively, and a band-shaped connecting portion 33 for connecting the spacers 32 and each of the spacers 32 is provided with a pair of concave seats which come into sliding contact with the adjoining rollers 3. Accordingly, each of the rollers 3 is held by the spacers 32 from on both front and rear sides of its rolling direction so that the rollers 3 are rotatably retained by the connecting member 31. Further, the spacer 32 and the connecting portion 33 at the front or rear end of the roller connector 30 have convex curved guide surfaces 34, respectively, so that the movement of the roller connector 30 at the time of rolling of the rollers 3 is made smooth.

Further, the connecting portion 33 connecting the spacers 32 is connected to the spacers 32 at a position at which the outer peripheral surface of the roller 3 is divided into substantially two equal parts in the axial direction and the end surfaces of each of the rollers 3 are left open without being covered by the connecting portion 33. Accordingly, the movement of each of the rollers 3 in the axial direction at the time of its rolling is regulated by the above-described roller guide portions 45.

Still further, the connecting portion 33 is provided only on one side of the rollers 3 arranged in a line and with respect to the direction opposite to the other side of the rollers 3, the roller connector 1 is made to bend freely. Consequently, where the roller connector 30 is incorporated into the endless circulation path of the slider 2, the connecting portion 33 is made to lie inside the endless circulation path as shown in FIGS. 1 and 2.

Such roller connector 30 is formed by injection-molding a synthetic resin material in such a manner that the rollers 3 are inserted, as cores, into a mold and by such injection molding, the connecting member 31 comprising each of the spacers 32 and the connecting member 31 which are integral with each other is formed and the roller connector 30 with the rollers 3 arranged along the connecting portion 33 can be taken out of the mold.

Figure 9:
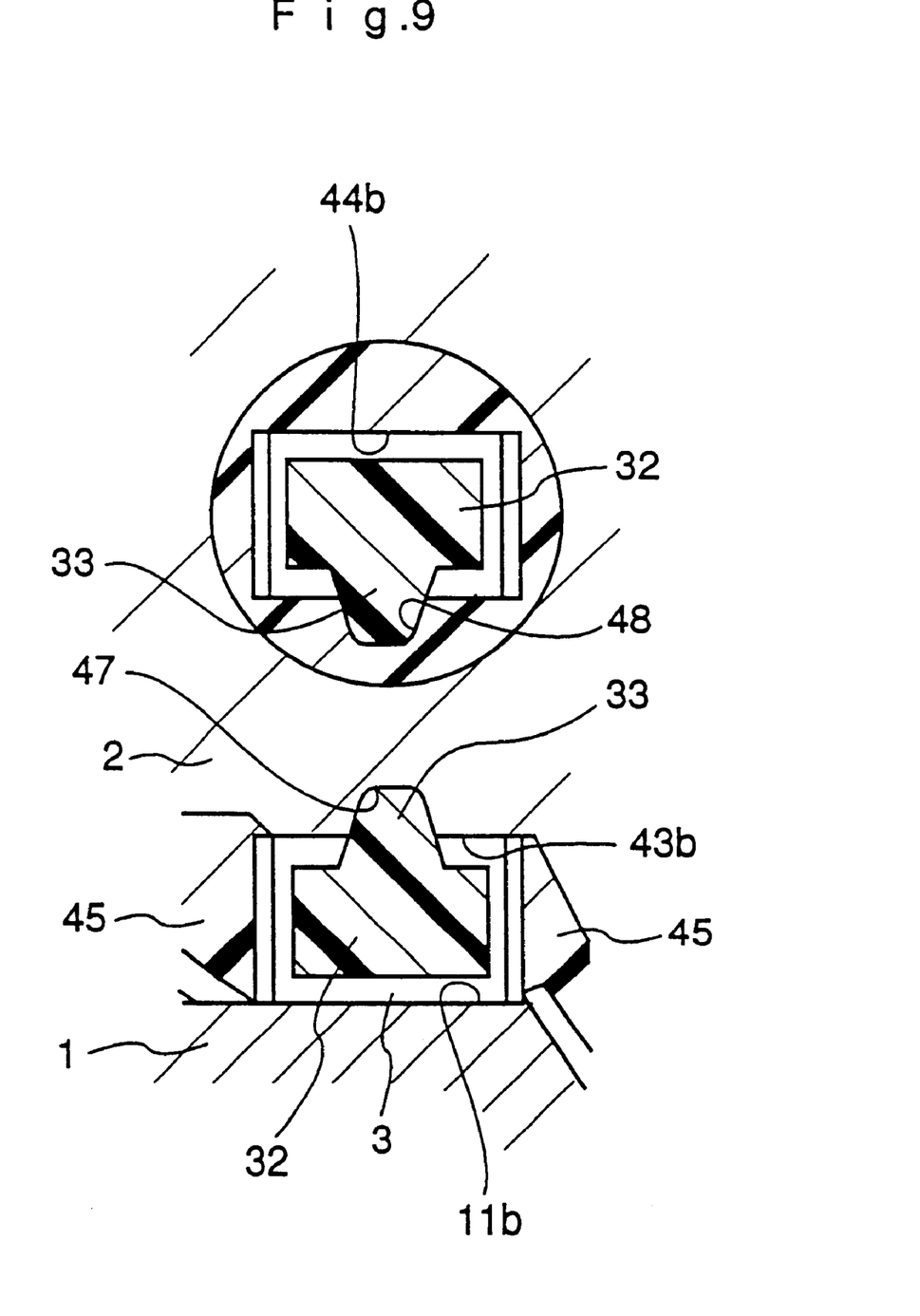
FIG. 9 is an enlarged sectional view of the roller connector shown in FIG. 6 especially when the roller connector is incorporated into the endless roller-circulation path of the slider of the linear guide unit according to the first embodiment of the present invention.
Figure 10:
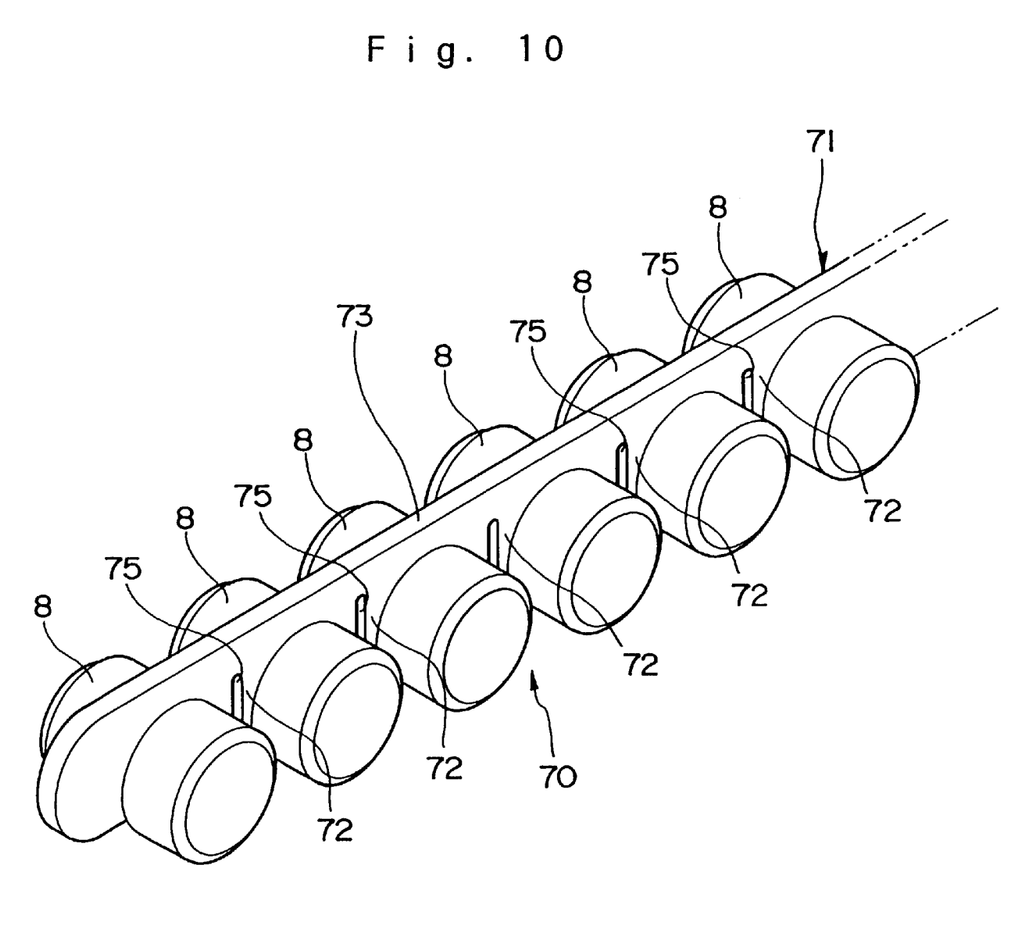
FIG. 10 is a perspective view of a roller connector to be incorporated into the linear guide unit according to a second embodiment of the present invention.
Figure 11:
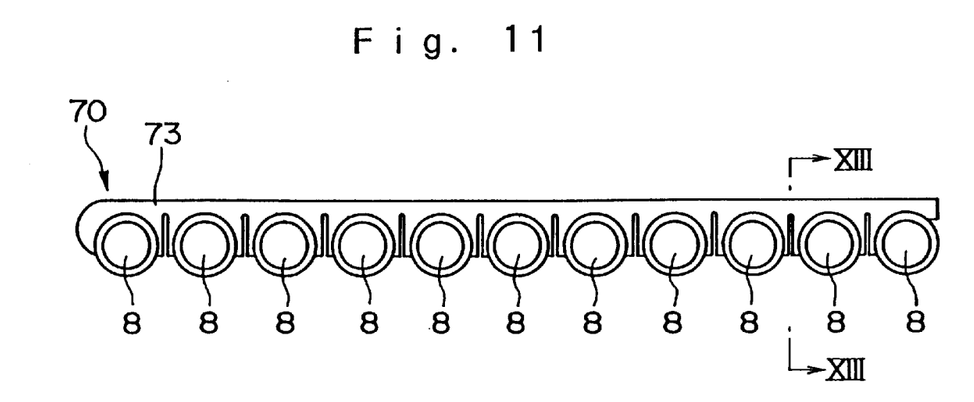
FIG. 11 is a front view of the roller connector shown in FIG. 10.
Figure 12:
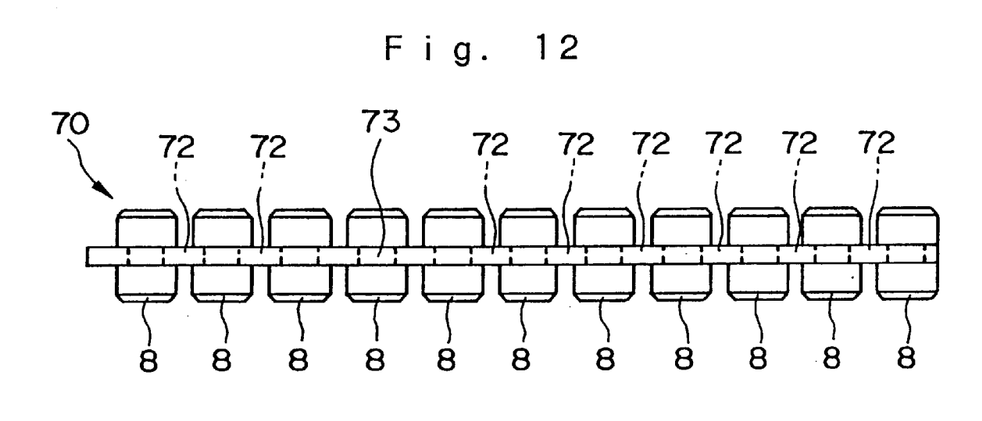
FIG. 12 is a plan view of the roller connector shown in FIG. 10.

FIG. 9 is an enlarged sectional view showing how the rollers 3 roll within the endless roller-circulation path. In the instant embodiment, the rollers 3 are incorporated into the endless roller-circulation path of the slider in a state in which they are arranged along the synthetic resin connecting member 31 as described above and the connecting portion 33 of the member 31 which connects the spacers 32 projects outwardly of the outer periphery of each of the rollers 3 so that the load rolling surfaces 43a and 43b of the slider 2 are respectively provided with clearance grooves 47 for receiving the connecting portion 33 while at the same time, similar clearance grooves 48 are respectively formed in the roller return ports 44a and 44b along the longitudinal direction. Accordingly, when the rollers 3 circulate through the endless roller-circulation path of the slider 2 following the movement of the slider 2 relative to the track rail 1, the roller connector 30 circulates through the endless roller circulation path together with the rollers 3 in a state in which the connecting portion 33 of the roller connector 30 is kept received within the clearance grooves 47 and 48.

Figure 17:
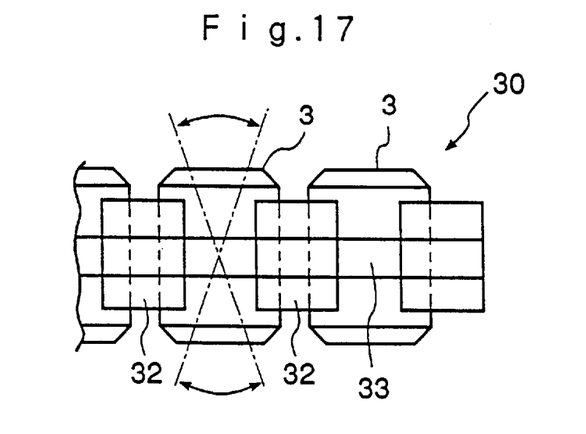
FIG. 17 is an enlarged sectional view illustrating how the connecting portion of the roller connector is affected by the skewing of each of the rollers.

According to the linear guide unit of the instant embodiment having the above-described structure, when the slider 2 moves on the track rail 1, the rollers 3 roll between the slider 2 and the track rail 1 and the roller connector 30 circulates through the endless track formed within the slider 2. In this case, even if a force urging each of the rolling rollers 3 to skew, that is, a force causing the axis of rotation of each of the rollers 3 to oscillate acts on the roller, since the connecting portion 33 of the roller connector 30 of the instant embodiment is connected to the spacers 32 at the position at which the connecting portion 33 connecting the spacers 32 together divides the outer peripheral surface of each of the rollers 3 into two substantially equal parts in the axial direction as shown in FIG. 17, the oscillatory force acts on each of the rollers 3 in the manner shown by the dashed lines about the central portion of the connecting portion 33 so that the connecting portion 33 does not expand and contract due to such oscillatory force. Consequently, the trouble that the roller connector 30 breaks within the endless roller-circulation path due to the fatigue of the connecting portion 33 at the early stage of operation can be avoided and it is possible to maintain the smooth circulation of the rollers 3 within the endless roller-circulation path for a prolonged period of time and to secure the smooth movement of the slider with respect to the track rail 1.

Further, in the case of the roller connector of the instant embodiment, the connecting portion for connecting the spacers is provided only on one side of the line of rollers and therefore, when compared to the conventional roller connector having roller connecting portions on both end surfaces of each of the rollers in the axial direction, the size of the roller return port formed in the slider can be reduced and it is possible to improve the mechanical rigidity of the slider to that degree of size-reduction.

FIGS. 10 through 14 show a roller connector according to a second embodiment of the present invention. As in the case of the first embodiment, the roller connector 70 comprises a connecting member 71 made of a flexible synthetic resin material and a plurality of rollers 8 arranged along the connecting member 71 in spaced apart relationships with one another with the axes of rotation of the rollers 8 being held parallel to one another. The connecting member 71 comprises a plurality of spacers 72 interposed among the adjoining rollers 8 and a band-shaped connecting portion 73 for connecting the spacers 72 together wherein each of the spacers 72 is provided with a pair of concave seats 74 which come into sliding contact with the adjoining roller 8. Further, each of the rollers 8 is provided on the peripheral surface thereof with an annular groove 81 so as to bisect the peripheral surface of the roller in the axial direction so that each of the spacers 72 fits in this annular groove 81 and the pair of concave seats 74 are in sliding contact with the roller 8 within the annular groove 81. Accordingly, each of the rollers 8 is embraced by the spacers 72 on both front and rear sides in the rolling direction thereof and is rotatably retained by the connecting member 71 while the movement of the roller 8 in the axial direction is held stopped by the spacers 72 fitted into the annular groove 81.

Figure 13:
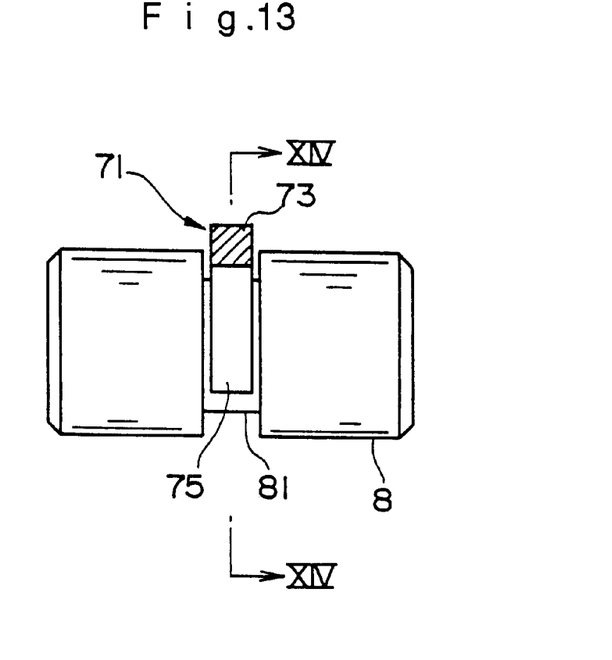
FIG. 13 is a sectional view taken along the XIII—XIII line of FIG. 11.
Figure 14:
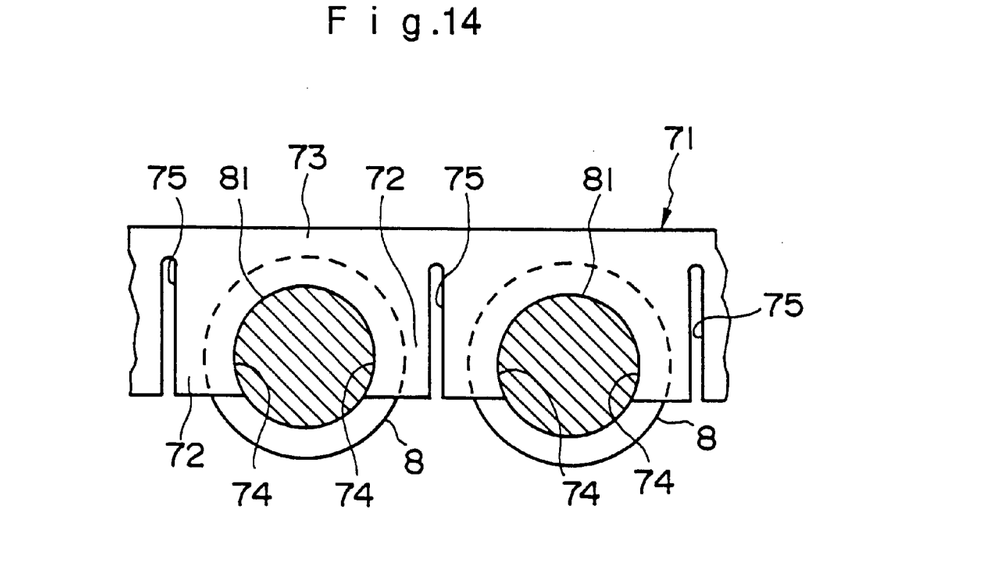
FIG. 14 is a sectional view taken along the XIV—XIV line of FIG. 13.

Further, as in the case of the roller connector 30 according to the first embodiment of the present invention, the connecting portion 73 is provided only on one side of the line of rollers 8 in such a manner that the roller connector 70 can be bent freely on that side. In addition, in the case of the roller connector 70 of this second embodiment, each of the spacers 72 is provided with a slit 75 which is so formed as to separate the pair of concave seats 74 formed on both sides thereof, respectively, as shown in FIGS. 13 and 14. More concretely, this slit 75 is formed in each of the spacers 72 from on the side opposite to the connecting portion 73.

Figure 15:
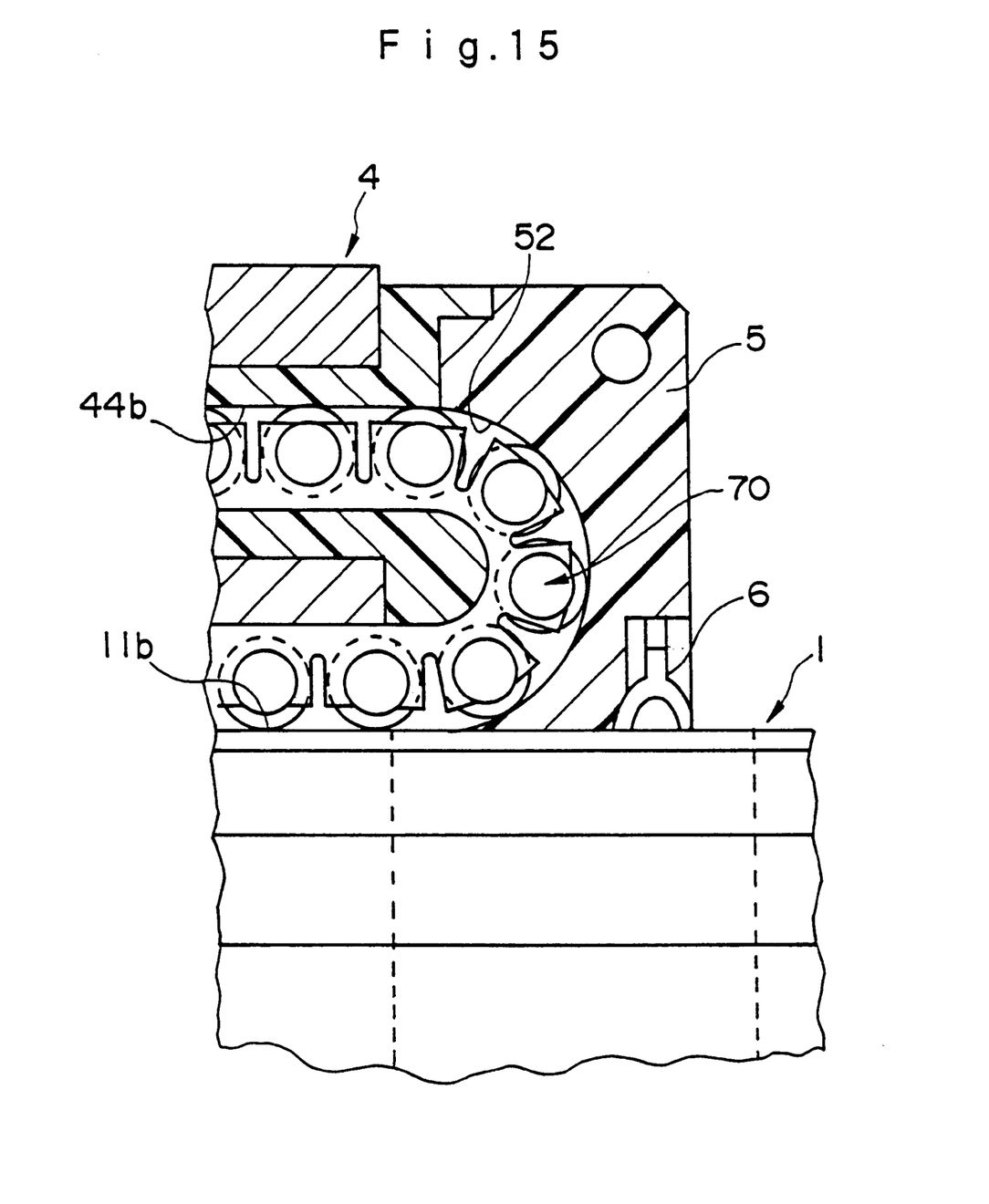
FIG. 15 is a sectional view of the roller connector shown in FIG. 10 especially when the roller connector is in its curved state within an endless roller-circulation path of a slider.

Accordingly, when the roller connector 70 is incorporated into the endless roller-circulation path of the slider 2, if it is incorporated in such a manner that the connecting portion 73 comes to lie at the inner side of the endless circulation path, each of the slits 75 opens wide when the roller connector 70 bends in the shape of the letter-U within the change direction path 52 as shown in FIG. 15 so that the spacer 72 bisected by the slit 75 can maintain a state in which the concave seats 74 are in sliding contact with each of the rollers 8. Consequently, the spacers 72 lying on both sides of each of the rollers 8 within the change direction path 52 securely retain the roller 8 thereby constantly stabilizing the posture of each of the rollers 8 rolling within the endless roller-circulation path of the slider.

The connecting member 71 provided with the spacers 72 and the connecting portion 73 is formed by injection-molding of a synthetic resin material but unlike the roller connector 30 of the first embodiment, each of the rollers 8 is mounted on the connecting member 71 after the connecting member 71 has been formed by molding. Thus, in the case of the roller connector 70 of the second embodiment, the slit 75 is formed in each of the spacers 72, so that in contrast to the connecting member of the first embodiment which is not provided with slits, the space between the pair of concave seats 74 retaining the rollers 8 can be opened wide with ease whereby each of the rollers 8 can be mounted between the spacers 72 with ease. Further, for the same reason, the replacement of the rollers 8 mounted on the connecting member 71 can be performed with ease so that the amount of pre-load on the linear guide unit can be adjusted with ease.

Figure 16:
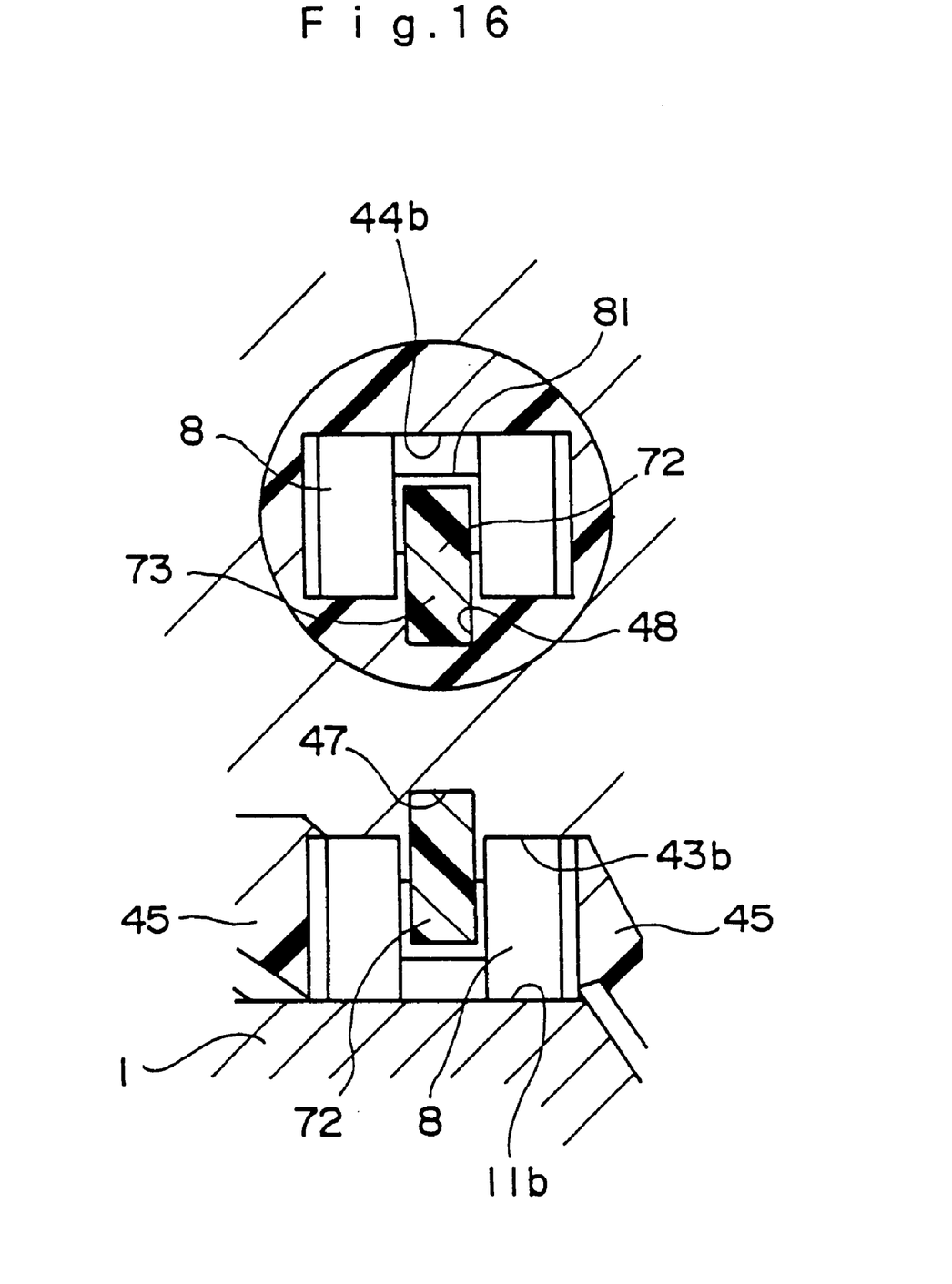
FIG. 16 is an enlarged sectional view of the roller connector shown in FIG. 10 especially when the roller connector is incorporated into the endless roller-circulation path of the slider.

FIG. 16 is an enlarged sectional view showing a state in which the roller connector 70 of the second embodiment of the present invention is incorporated into the endless circulation path of the linear guide unit shown in FIGS. 1 and 2. As in the case of the roller connector 30 of the first embodiment, also in the roller connector 70 of the second embodiment, the connecting portion 73 which connects the spacers 72 together projects outwardly of the outer peripheral surfaces of the rollers 8 so that it is received within the clearance grooves 47 formed in the load rolling surfaces 43a and 43b of the slider 2 and also in the clearance grooves 48 formed in the roller return ports 44a and 44b. Consequently, where the roller connector 70 circulates through the endless roller-circulation path of the slider 2, the connecting portion 73 of the roller connector 70 of the second embodiment can be always guided by the clearance grooves 47 and 48 on the side of the slider 2.

As in the case of the roller connector 30 of the first embodiment, the roller connector 70 of this second embodiment is constructed such that the connecting portion 33 which connects the spacers 32 together is connected to each of the spacers 32 at a position at which the connecting portion 33 divides the outer peripheral surface of each of the rollers 3 into two substantially equal parts in the axial direction and further, it is provided only on one side of the line of rollers so that the second embodiment of the invention produces the same operation and effect as in the case of the first embodiment.

Further, in addition to the above, since the spacers 72 formed integral with the connecting-portion 73 stop the axial movement of each of the rollers 8, when the connecting portion 73 is guided by the clearance grooves 47 and 48, the rollers 8 are also guided by these clearance grooves 47 and 48 whereby the axial movement of each of the rollers through the endless roller-circulation path can be prevented by the clearance grooves 47 and 48. Therefore, where the roller connector 70 of the second embodiment is incorporated into the endless roller-circulation path of the linear guide unit for use, the endless circulation of the rollers can be guided smoothly without the necessity of providing roller guides 45 on both sides of the load rolling surfaces 43a and 43b so as to guide both end surfaces of each of the rollers 8 thereby simplifying the structure of the linear guide unit.

It should be noted in this connection that the roller connector 70 of the second embodiment can be bent smoothly within the change direction path 52 of the slider due to the provision of the slit 75 in each of the spacers 72 but the roller connector 30 of the first embodiment will be able to be done so if the same slit is formed in each of the spacers 32 of the roller connector 30.

Further, the connecting member 31 of the first embodiment and the connecting member 71 of the second embodiment are made of a synthetic resin material but the spacers 32 and the connecting portion 33 forming the connecting member 31 or the spacers 72 and the connecting portion 73 forming the connecting member 71 may be formed integral with each other by using the same material or by using different materials. When the different materials are used, it is preferable that the material for forming the connecting portion 33 (73) have an anti-abrasion property higher than that for the spacer 32 (72).

As described above, according to the roller connector of the present invention and the linear guide unit using the same, the connecting portion which connects the spacers interposed among the adjoining rollers is connected to each of the spacers at a position at which it divides the outer peripheral surface of each of the rollers into two substantially equal parts in the axial direction so that the connecting portion does not get fatigued at the early stage of operation due to a force urging the rolling rollers to skew with the advantages that there is no fear of breakage of the roller connector within the endless roller-circulation path of the linear guide unit and it is possible to secure the smooth movement of the slider with respect to the track rail for a prolonged period of time.

Further, where the roller connector of the present invention is incorporated into the endless roller-circulation path of the slider of the liner guide unit, it is possible to make the sectional area of the endless roller-circulation path for the passage of the rollers therethrough smaller than that of the conventional roller connector. Consequently, it becomes possible to prevent the lowering of the rigidity of the slider thereby improving the moving accuracy and the load bearing capacity of the slider and also to make the slider compact with ease.

What is claimed is:

1. A roller connector assembly comprising a plurality of rollers arranged in a line while keeping the axes of rotation thereof parallel to one another, a plurality of spacers interposed among the rollers and provided with concave seats with which the rollers come into sliding contact and an elongate flexible connecting portion adapted to connect said spacers with one another, wherein said connecting portion is connected to said spacers at a position at which the outer peripheral surface of each of said rollers is divided into two substantially equal parts in the axial direction and is arranged only at one side of said line of rollers.

2. The roller connector assembly as claimed in claim 1, wherein an annular groove is formed on the outer peripheral surface of each of the rollers at a position along which the outer peripheral surface is bisected in the axial direction and each of said spacers fits in the annular groove so as to come into sliding contact with each of said rollers.

3. The roller connector assembly as claimed in claim 1, wherein each of said spacers is provided with a pair of concave seats on both sides thereof, respectively, and a slit formed on the side opposite said connecting portion so as to separate said pair of concave seats.

4. A linear guide unit comprising a roller connector assembly retaining a plurality of rollers, a track rail having rolling surfaces for the rollers; and a slider having an endless roller-circulation path which includes load rolling surfaces along which the rollers roll with respect to the rolling surfaces of the track rail while bearing a load thereon, wherein said roller connector assembly which is claimed in any one of claims 1 through 3 is incorporated into said endless roller-circulation path of the slider in such a manner that the connecting portion of said roller connector assembly comes to lie on the inner peripheral surface portion of said endless roller-circulation path and said endless roller-circulation path is provided with clearance grooves by which the connecting portion of said roller connector assembly is received and guided.

* * * * *